United States Patent
Cox

(10) Patent No.: US 6,192,339 B1
(45) Date of Patent: Feb. 20, 2001

(54) MECHANISM FOR MANAGING MULTIPLE SPEECH APPLICATIONS

(75) Inventor: Cory W. Cox, Hillsboro, OR (US)

(73) Assignee: Intel Corporation, Santa Clara, CA (US)

(*) Notice: Under 35 U.S.C. 154(b), the term of this patent shall be extended for 0 days.

(21) Appl. No.: 09/187,571

(22) Filed: Nov. 4, 1998

(51) Int. Cl.[7] .................................................. G10L 21/06
(52) U.S. Cl. ......................... 704/270; 704/275; 704/276
(58) Field of Search ................................... 704/270, 271, 704/272, 273, 274, 275, 276, 231; 379/88.02

(56) References Cited

PUBLICATIONS

ViaVoice Gold; First Looks Online; PC Magazine; Feb. 6, 1998; 2 pages.

Primary Examiner—David R. Hudspeth
Assistant Examiner—Susan Wieland
(74) Attorney, Agent, or Firm—Blakely, Sokoloff, Taylor & Zafman LLP

(57) ABSTRACT

In one embodiment of the method and apparatus for managing multiple speech applications, a common development platform and a common environment are provided. The common environment interfaces with the speech applications, receives information from an application information storage and a plurality of speech input sources, allows the speech applications to execute simultaneously and transitions from one said speech application to another seamlessly. In addition, the speech applications are developed based on the common development platform. Thus, application developers may utilize the common development platform to design and implement the speech applications independently.

21 Claims, 7 Drawing Sheets

MECHANISM FOR MANAGING MULTIPLE SPEECH APPLICATIONS

FIELD OF THE INVENTION

This invention relates to speech processing generally and particularly to systems capable of managing multiple speech applications.

BACKGROUND OF THE INVENTION

As computer systems become more pervasive in society, these systems' inability to effectively communicate with their users have also become more apparent. Firstly, users must learn archaic commands or non-intuitive procedures in order to accomplish their desired tasks. Secondly, users are constrained to use many of the conventional input devices such as mice or keyboards to input these commands. With the advancement in speech processing and related technologies, one proposed solution to ameliorate the mentioned inefficiency is a speech or voice recognition system.

A speech recognition system has the ability to audibly detect human speech, parse out that speech and generate a string of words, sounds or phonemes to represent the speech. The system also possesses the ability to translate the generated words, sounds or phonemes into corresponding machine commands and execute the commands.

Some speech recognition systems are available in the marketplace. For example, IBM's ViaVoice Gold, a desktop application available on a computer system, allows a user to speak to the computer system's input device and activates certain command-and-control menus/windows. Specifically, if the user is using a word processing program, the user can say, "File Command, Open", and the File Open window pops up. The user can then select an existing file from the File Open window with the computer system's mouse and then say, "Open" to the computer system's input device. In response to the "Open" command, the desired document appears.

Products such as ViaVoice Gold possess certain drawbacks: 1) these products often require a user's manual interaction with the system. In the example given above, before the user can issue the voice command, "Open", the user must first manually select the file with a mouse. 2) These products only support a single local user. Specifically, the user needs to be in front of or be in the vicinity of the computer systems in order to speak into the input devices of such systems. Additionally, these products are not capable of handling multiple speech applications. They are often designed to receive and process voice commands from one speech source. 3) These products are not designed to work with other vendors' products. As a result, if a user desires dictation functionality in one product and device control functionality in another, unless both products are manufactured by the same vendor, the user most likely will fail to obtain both functionality in a seamless fashion.

As has been demonstrated, an improved method and apparatus is needed to manage multiple speech applications.

SUMMARY OF THE INVENTION

A method and apparatus for managing multiple speech applications is disclosed. In one embodiment, a common development platform is provided to develop the speech applications. Thus, independently application developers may utilize the common development platform to design and implement these speech applications.

Additionally, a common environment for the mentioned speech applications is provided. The common environment allows these speech applications to execute simultaneously. The common environment also permits one of the speech applications to transition to another seamlessly. One likely outcome is a user's illusory impression of operating on a single speech application as opposed to the actual operation of multiple speech applications.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus for managing multiple speech applications is described. In the following description, numerous specific details are set forth such as listeners, transition command mapping, application information storage, device control program, answering machine program, etc. in order to provide a thorough understanding of the present invention. However, it will be apparent to one of ordinary skill in the art that the invention may be practiced without these particular details. In other instances, well known elements and theories such as speech or voice recognition, speech processing, registry, multithreading programming, Application Programming Interface (API), etc. have not been discussed in special details in order to avoid unnecessarily obscuring the present invention.

Moreover, applications capable of recognizing and translating voice commands or speech into actual machine commands and executing the machine commands are referred to as speech applications throughout the following discussions. Speech recognition engines provide the recognition capability in these speech applications, and command translators provide the translation functionality. It should be emphasized that the present invention works with different speech applications embodying various speech recognition engines or command translators.

Figure 1A:
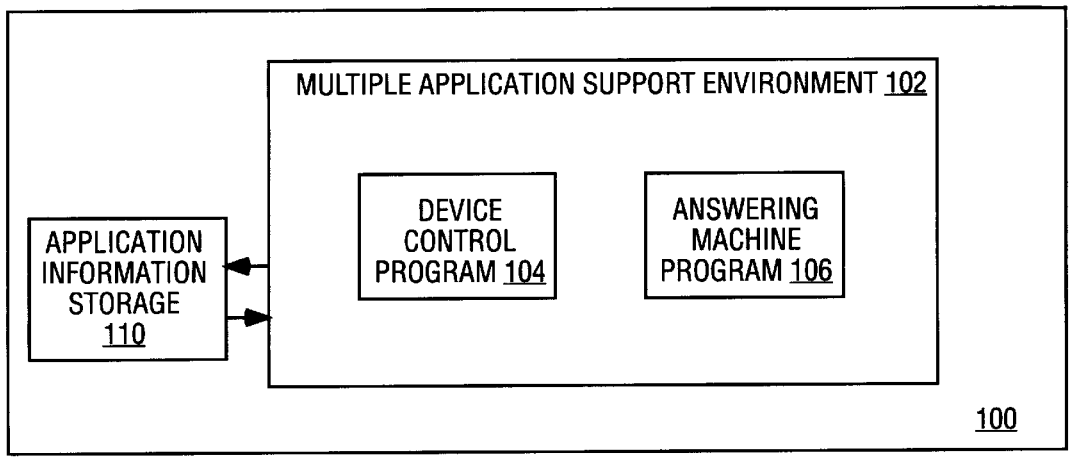
FIGS. 1A and 1B illustrate two approaches to implement the present invention.
Figure 1B:
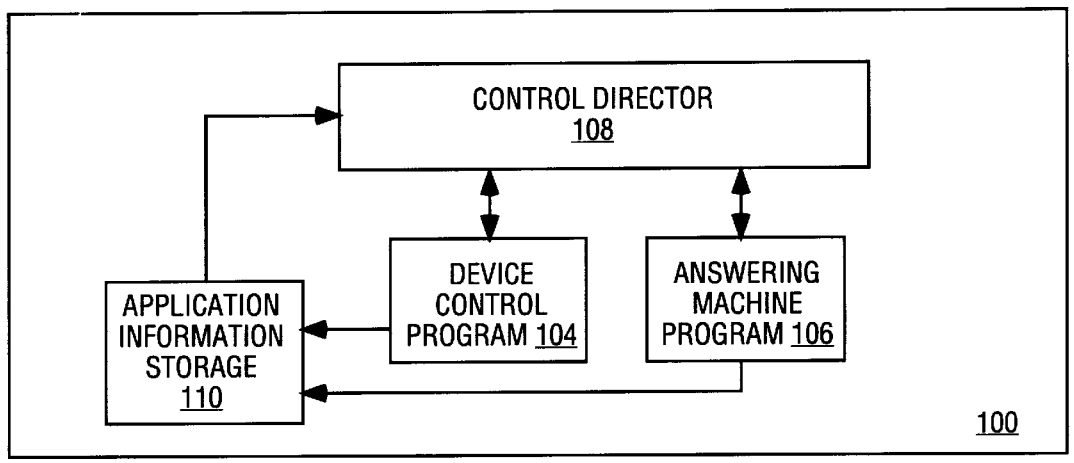

The illustrative block diagrams in FIGS. 1*a* and 1*b* can be programmed or implemented in various types of electronic systems 100. Some examples of electronic systems 100 are, but not limited to, add-in circuit boards, standalone electronic apparatuses and general purpose computer systems. A general purpose computer system 300 is further illustrated in FIG. 3.

Additionally, FIGS. 1*a* and 1*b* also demonstrate two approaches to implement the present invention. The illustrative system in FIG. 1*a* utilizes a distributed computing model embodied upon electronic system 100. Specifically, speech applications such as device control program 104 and answering machine program 106 interact with each other and also with Multiple Application Support Environment 102 (hereinafter "MASE 102") seamlessly. With seamless interaction, a user of these multiple speech applications likely has an illusory impression of operating on one single application. Though yielding the same illusion, FIG. 1b utilizes a centralized control module. In particular, control director 108 retrieves information on behalves of device control program 104 and answering machine program 106. Upon retrieving information or requests from these speech applications, control director 108 instructs the speech applications to perform appropriate tasks accordingly.

The general purpose computer system architecture comprises microprocessor 302 and cache memory 304 coupled to each other through processor bus 305. Sample computer system 300 also includes high performance I/O bus 308 and standard I/O bus 318. Processor bus 305 and high performance I/O bus 308 are bridged by host bridge 306, whereas high performance I/O bus 308 standard I/O bus 318 are bridged by I/O bus bridge 310. Coupled to high performance I/O bus 308 are main memory 312 and video memory 314. Coupled to video memory 314 is video display 316. Coupled to standard I/O bus 318 are mass storage 320, and alphanumeric input device or other conventional input device 322. Some examples of conventional input device 322 are, but not limited to, microphones, speakers, telephones and modems.

These elements perform their conventional functions well known in the art. In particular, mass storage 320 may be used to provide permanent storage for the executable instructions for an embodiment of the present invention, whereas main memory 312 may be used to temporarily store the executable instructions of an embodiment of the present invention during execution by CPU 302.

OPERATION OF THE PRESENT INVENTION

The invention at hand is a method and apparatus for managing multiple speech applications. Specifically, the present invention manages and maintains seamless interactions among multiple speech applications.

Figure 2:
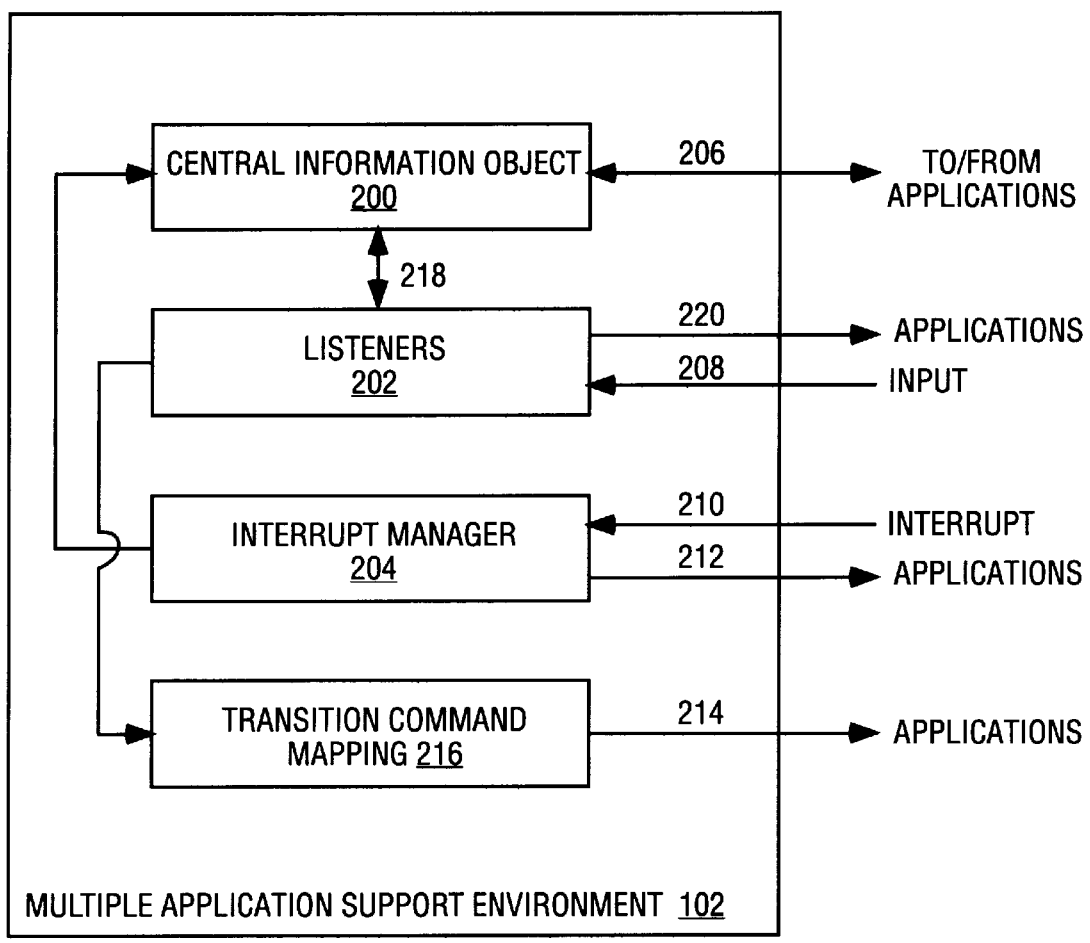
FIG. 2 illustrates the block diagram of one embodiment of the present invention.

FIG. 2 illustrates the block diagram of one embodiment of the present invention operating on electronic system 100 or in particular, general purpose computer 300. Although the embodiment is applicable in either the distributed computing model shown in FIG. 1a or the centralized computing model shown in FIG. 1b, in order to avoid unnecessarily obscuring the present invention, the subsequent discussions on the illustrative embodiment in FIG. 2 assume the distributed computing model, or MASE 102. The embodiment has central information object 200, at least one listener 202, interrupt manager 204 and transition command mapping 216. Central information object 200 maintains the states of MASE 102. Listeners 202 communicate with their corresponding speech applications. Interrupt manager 204 handles incoming interrupts. Transition command mapping 216 allows a user to select a desired speech application on which to focus. The "focused" application then obtains the responsibilities to process the user's incoming commands.

To begin with, central information object 200 maintains information from listeners 202 and speech applications such as device control program 104 and answering machine program 106 shown in FIGS. 1a and 1b. Speech applications may either modify or retrieve the information stored in central information object 200 through signaling interface 206. Similarly, listeners 202 may either modify or retrieve the same information through signaling interface 218. Central information object 200 may contain any of the following data, but not limited to, 1) currently focused speech application, 2) listening state of any speech recognition engine, 3) performance parameters and 4) graphical user interface support information. Multiple speech applications utilize these data to comprehend the running states of MASE 102 and thus result in their seamless interactions with one another.

Figure 3:
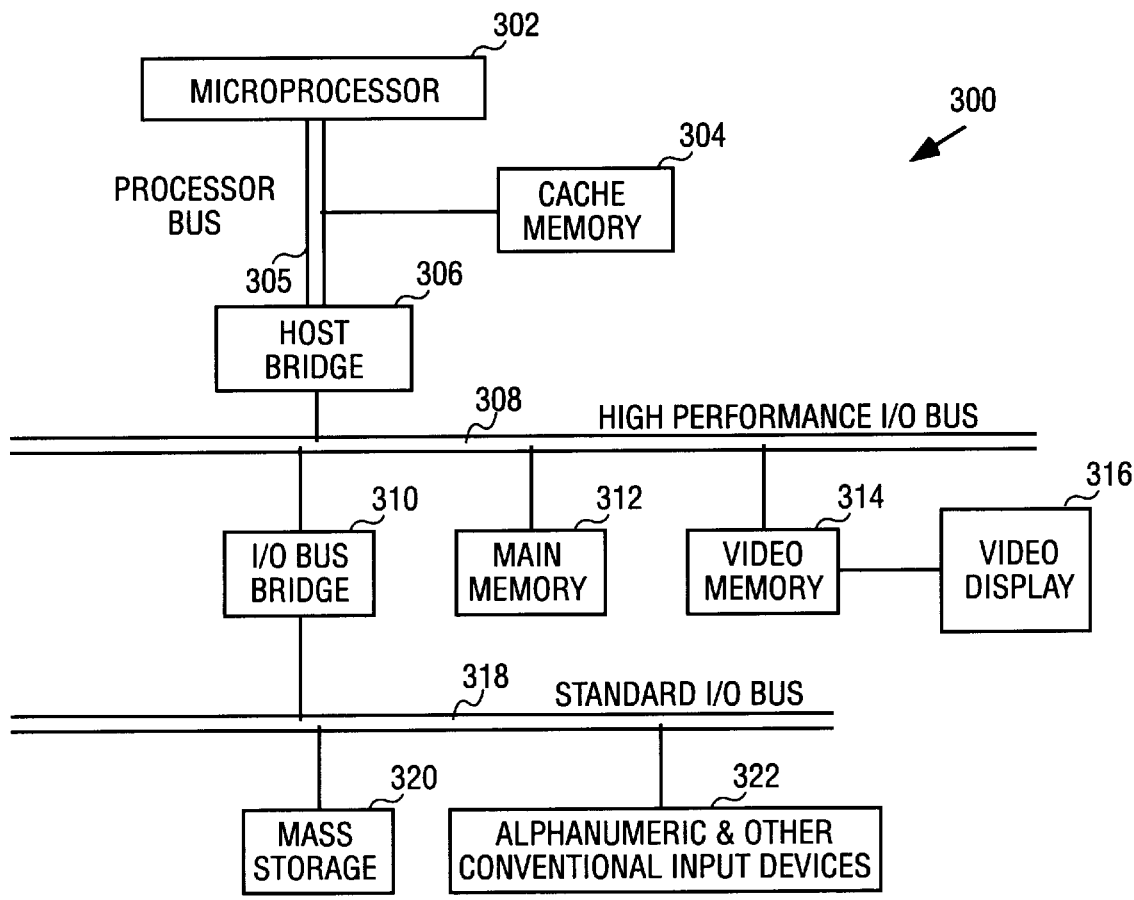
FIG. 3 illustrates a general purpose computer system architecture.

Another component of the present invention is listeners 202. Listeners 202 retrieve input information 208 from application information storage 110 as illustrated in FIGS. 1a and 1b and from speech input sources 322 as illustrated in FIG. 3. It should be noted that one specific type of application information storage 110 is a registry system. The registry system, or the registry, is a hierarchical database which contains persistent information from the operating system, application programs, etc.

In order to demonstrate the operations of listeners 202 clearly, unless otherwise stated, the registry and application information storage 110 are used interchangeably in the following discussions. First, speech applications write their attributes into the registry after the applications have been installed onto computer system 300 as illustrated in FIG. 3. Some examples of the attributes are, but not limited to, 1) name of the speech application, 2) the corresponding binary files to the speech application, 3) location of these files, 4) ability to handle remote users, 5) ability to handle multiple instances of the application, and 6) the application's execution frequency.

Listeners 202 read the registry and generate transition command mapping 216 based on the retrieved attribute information. This is discussed in more detail below. Additionally, using information from central information object 200, listeners 202 route appropriate input voice commands to their corresponding speech applications through signaling interface 220. In one embodiment of the present invention, a single listener 202 is created to service each individual speech application. However, it should be apparent to one ordinarily skilled in the art to implement other schemes, such as one listener for a class of speech applications or one listener for all speech applications, without exceeding the scope of the present invention.

It should be noted that the mentioned speech applications either contain their own speech recognition engines or commonly share at least one speech recognition engines. Although speech recognition technology is a well known art, the present invention does not concentrate on this speech processing technology. Instead, the invention at hand focuses on the management of multiple speech applications. Therefore, the present invention can utilize any speech recognition engine with any speech processing algorithm without departing from the scope of the invention.

As has been mentioned, listeners 202 generate transition command mapping 216. More specifically, based on the attributes of various speech applications, such as the names of the applications, transition command mapping 216 contains items such as "switch to application XYZ" and maps those items to their corresponding machine commands. Using speech applications, device control program 104 and answering machine program 106 shown in FIGS. 1a and 1b, as an illustration, transition command mapping 216 includes "switch to application device control program" and "switch to application answering machine program". These statements map to actual machine commands to execute and focus on device control program 104 and answering machine program 106.

Since transition command mapping 216 provides users a mechanism to select a desired application to execute, other forms of transition command mapping 216 may be used without exceeding the scope of the present invention. For example, transition command mapping 216 may utilize different semantics for its generated statements, such as "focus on application XYZ" or "execute application XYZ". Also, transition command mapping 216 may display to a local user a list of available speech applications to choose from. Furthermore, in addition to generating the mapping according to application names, listeners 202 may generate transition command mapping 216 with other attributes of the applications. For instance, if answering machine program 106 writes an attribute of "always running" for its execution frequency, transition command mapping 216 can map the "switch to answering machine program" statement to actual machine commands which always execute answering machine program 106.

In cases of these always-running applications or other interrupt driven applications, interrupt manager 204 handles their incoming interrupts 210. When interrupt manger 204 receives interrupts 210, interrupt manager 204 provides messages to speech applications or modifies central information object 200. Interrupts 210 are generated by events such as incoming telephone calls, reminder notifications, etc.

Moreover, since the present invention supports simultaneous users, the invention also includes a mutual exclusion policy mechanism to allocate system resources. More particularly, when only one speech recognition engine is available, the mutual exclusion policy may limit a single listener 202 to be active at a time. In other words, until the active listener's corresponding speech application finishes processing, other listeners/speech applications pairs may not proceed.

Alternatively, when one speech recognition engine is available for each speech application, the mutual exclusion policy may allow multiple listeners 202 to be active simultaneously, but limit to a single instance of speech application per listener 202. As a result, multiple distinct speech applications can coexist simultaneously. By utilizing central information object 200, all applications have access to the state information of other applications and the environment. Based on the state information, the mutual exclusion policy may allow applications to proceed based on the significance of their tasks, the amount of time allotted to their tasks or other prioritizing schemes. Although some specific mutual exclusion policies are described, it should be obvious to one ordinarily skilled in the art to use other mutual exclusion policies without exceeding the scope of the present invention.

Having discussed each illustrated component in FIG. 2, it should be apparent to one ordinarily skilled in the art to separate or combine certain functionality of these components. For instance, the functionality of interrupt manager 204 can be incorporated into listeners 202 without departing from the scope of the present invention.

Figure 4:
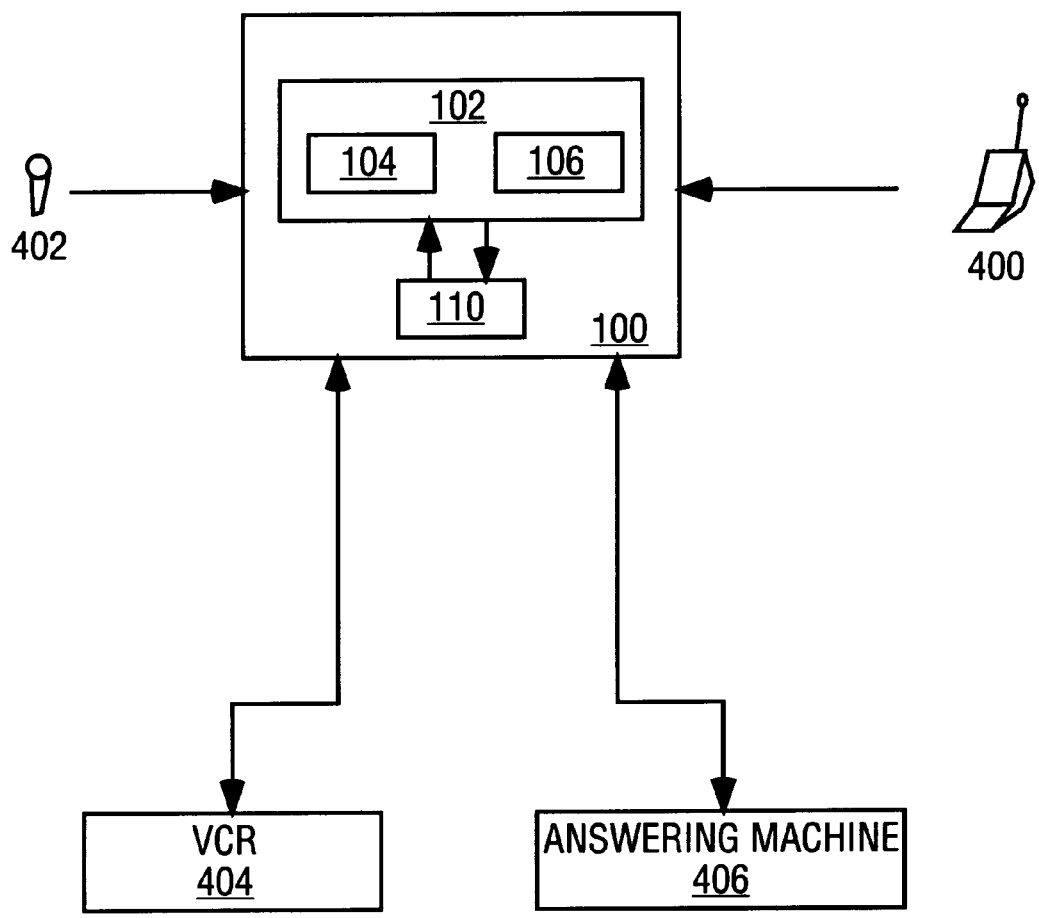
FIG. 4 illustrates an example utilizing one embodiment of the present invention.
Figure 5:
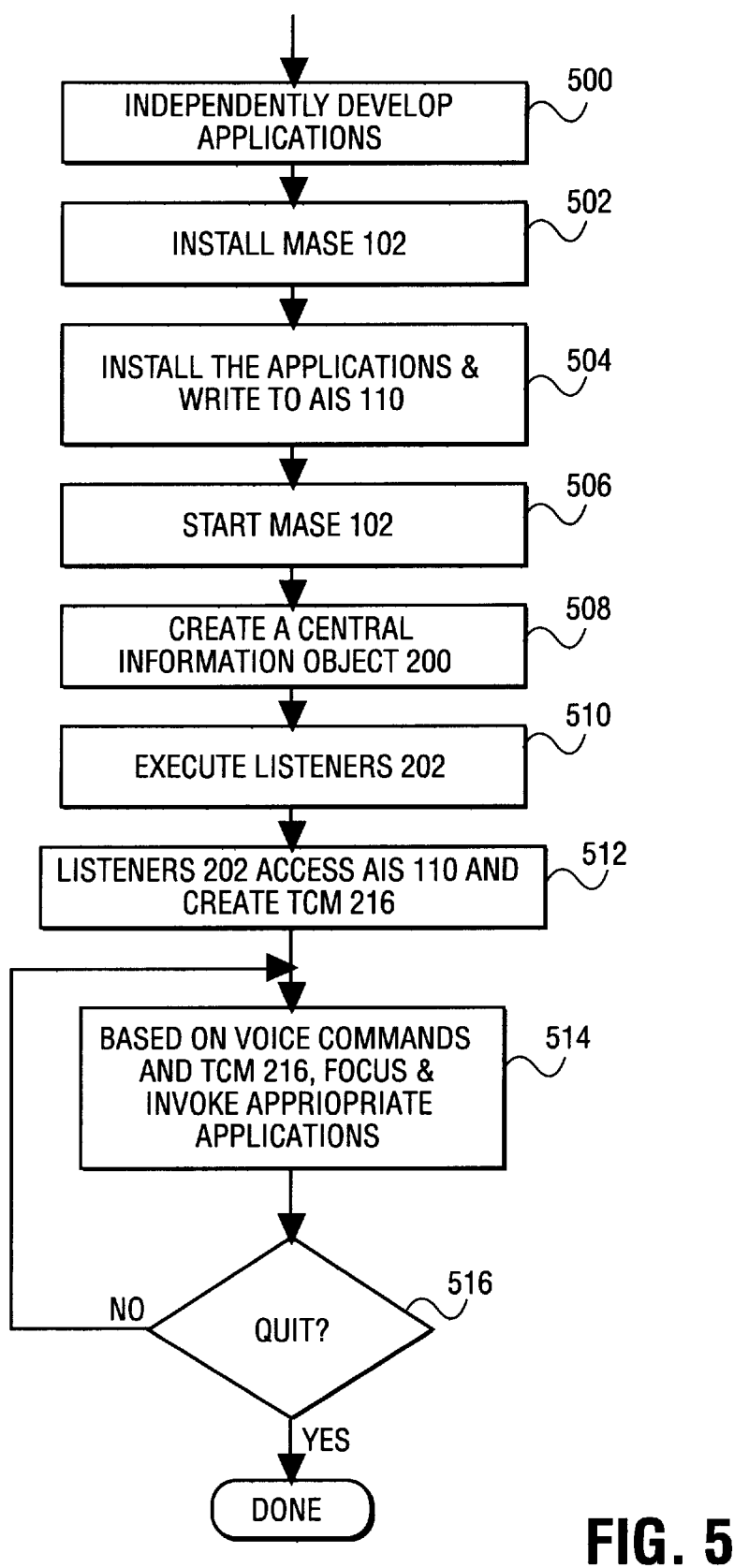
FIG. 5 illustrates a flow chart for operating the present invention.

The operations of the various components in FIG. 2 can be further demonstrated through an example system in FIG. 4 and a flow chart in FIG. 5. FIG. 4 illustrates electronic system 100 as the one shown in FIG. 1a, having embodied thereon instructions of MASE 102, device control program 104 and answering machine program 106. MASE 102 further contains instructions for central information object 200, listeners 202, interrupt manager 204 and transition command mapping 216. Electronic system 100 has two voice inputs: one is a local input, microphone 402, and the other is a remote input, telephone 400. Furthermore, electronic system 100 is connected to devices VCR 404 and answering machine 406. Device control program 104 interacts with VCR 404, and answering machine program 106 interacts with answering machine 406.

Referring to the flow chart in FIG. 5, the first step is to develop device control program 104 and answering machine program 106. It should be emphasized that these speech applications can be developed by independent developers, because the present invention offers a common development platform. The common development platform may include, but not limited to, an appropriate API and development environment. After the applications have been developed using the common development platform in step 500, the present invention's common environment, MASE 102 is installed onto electronic system 100 in step 502.

With the installed MASE 102, step 504 installs the developed speech applications. In step 504, these developed applications also write their attributes into application information storage 110, or the registry. Using FIG. 4 as an example, the registry likely contain but not limited to:

"device control program", "answering machine program" for the name attribute, locations of the binary files for both applications for the file and file location attributes, support remote usage for both applications for the remote capability attribute, allow only one instance of both applications for the mutual exclusion policy attribute, and a value representing "always" in "answering machine program" for the execution frequency attribute.

After both the environment and the speech applications have been installed, the environment MASE 102 is initiated in step 506. MASE 102 then creates a central information object 200 in step 508 and activates listeners 202 in step 510. Listeners access application information storage 110, or the registry, in step 512 and create transition command mapping 216. Again using FIG. 4 as an illustration, transition command mapping 216 at this point likely contains "switch to device control program" and "switch to answering machine program" items. Depending on the voice input, corresponding machine commands derived from transition command mapping 216 are issued, and the appropriate speech applications become focused and begin executing in step 514.

In one scenario, a user may say: "switch to device control program" through microphone 402. A flow chart in FIG. 6 further elaborates on step 516 shown in FIG. 5. Particularly, step 600 queries one attribute information in the registry, namely, the status of the speech recognition engine for device control program. If the engine is not ready to process the next command, MASE 102 either displays a "not ready" notification or produces a "not ready" sound notification. When the engine is ready to proceed, "switch to device control program" is received in step 602 and processed in step 604. Voice inputs are converted to symbols compatible to symbols in transition command mapping 216. When the "switch to" inputs match items in transition command mapping 216 in step 606, the corresponding machine commands are issued to the appropriate application. In this case, the application is device control program 104. If no match is detected, the user is notified in step 608 and asked if he or she wants to continue trying.

Once device control program 104 is focused in step 610, all the subsequent voice commands are considered application specific commands, unless another "switch to" command is issued. Similar to the previous discussion, after speech recognition engine for device control program 104 is ready, the user may say "Turn on VCR". Again, it should be noted that the user is talking through microphone 402 and is thus a local user. After "Turn on VCR" is received and processed in steps 614 and 616, device control program 104's speech recognition engine determines whether such phrase is recognizable in step 618. If step 618 yields true, device control program 104 sends necessary signaling to VCR 404 and turn on VCR 404. Otherwise, MASE 102 prompts the user and asks if he or she wants to continue in step 620.

Figure 7:
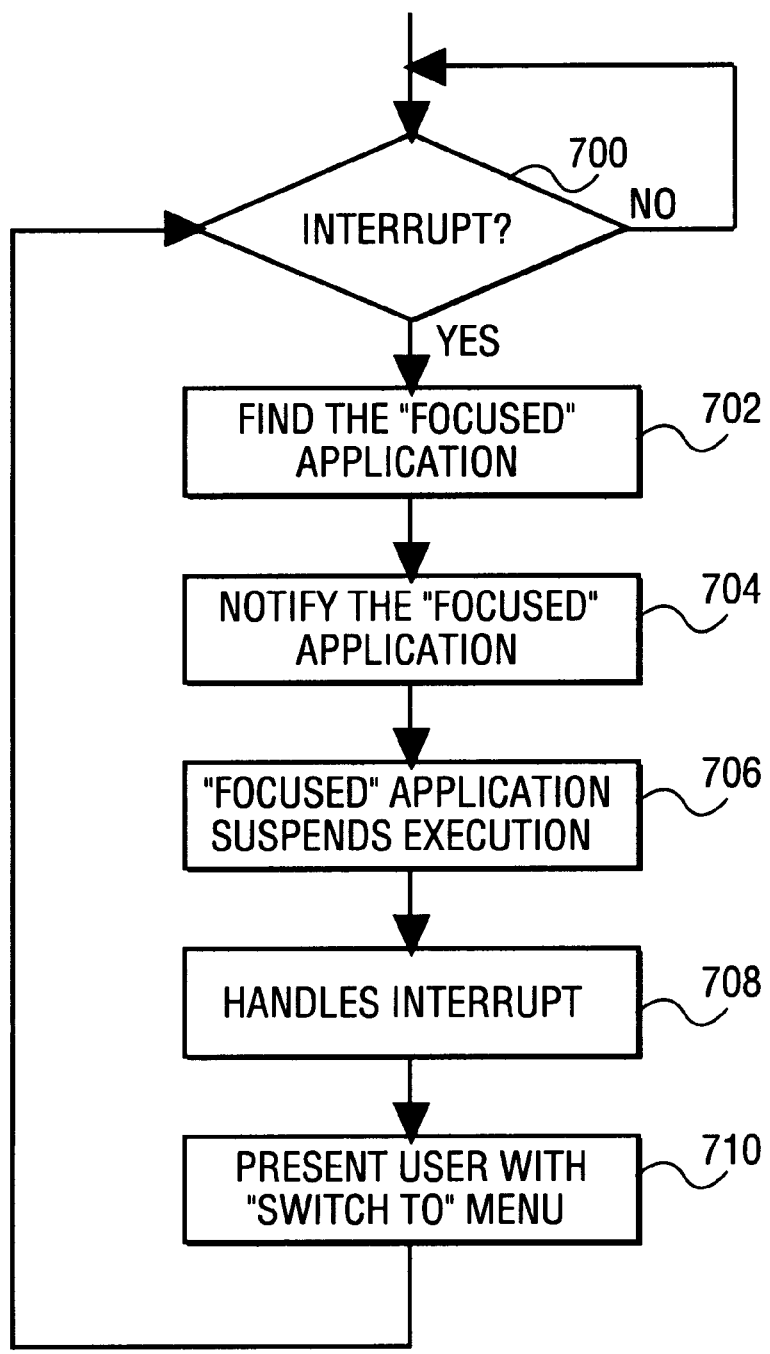
FIG. 7 illustrates a flow chart to demonstrate seamless transition among multiple speech applications.

While local user is attempting to manipulate VCR 404, a remote user may call in through telephone 400 and want to check his or her answering machine 406. FIG. 7 illustrates how the present invention handles such a situation and thus demonstrates the simultaneous support for a local user and a remote user. Since answering machine program 106 has an "always" execution frequency, the program is already running in the background and its corresponding listener is active. Interrupt manager 204 monitors incoming interrupts in step 700. When telephone 400 is off hooked, an interrupt is generated. In step 702, interrupt manger 204 proceeds to find the currently "focused" application, or device control program 104 in the instant case, through central information object 200. Interrupt manger 204 then notifies device control program 104 using messages supported by the present invention's common development platform.

Figure 6:
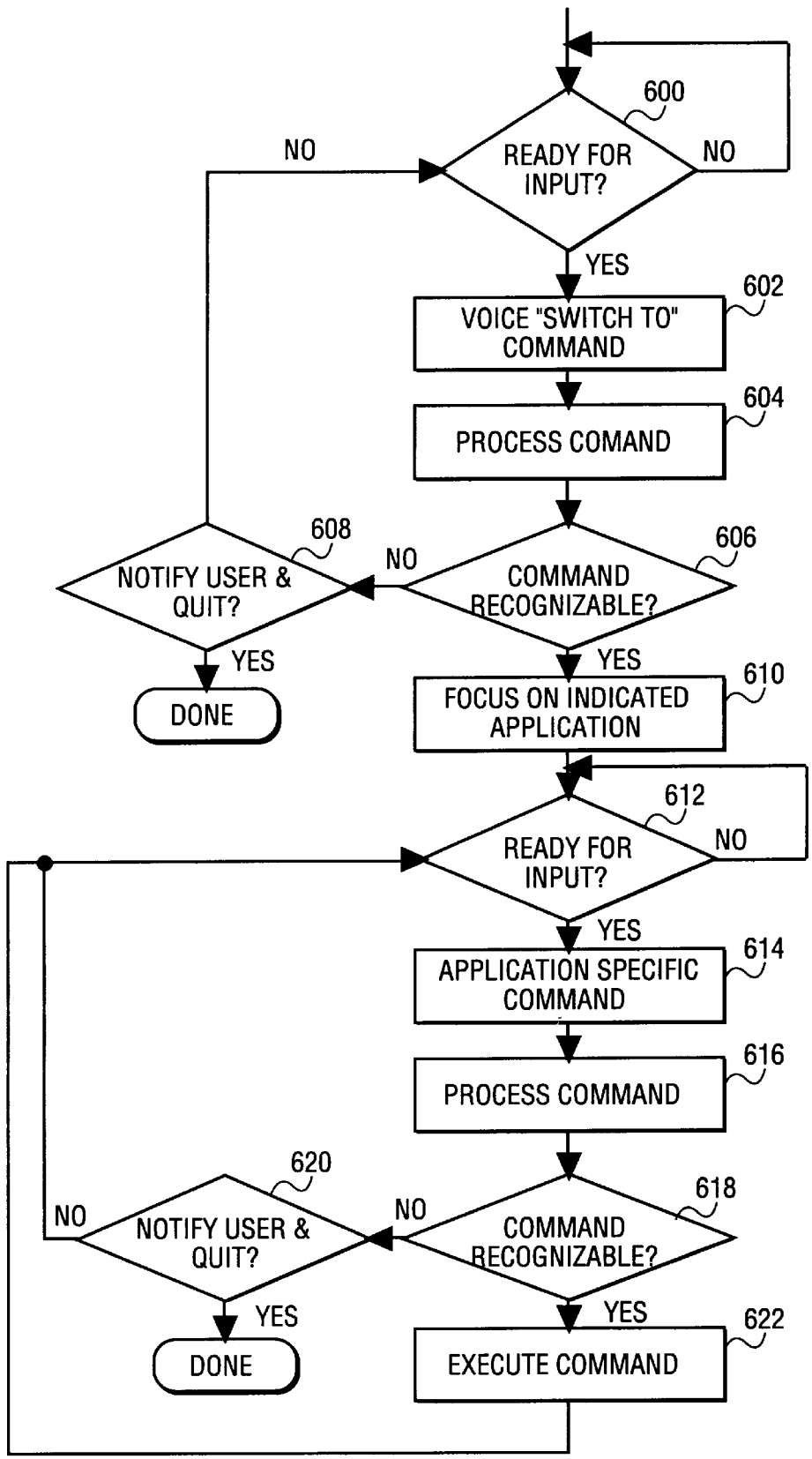
FIG. 6 illustrates a flow chart to demonstrate one scenario of operating the present invention.

Depending on the mutual exclusion policy and the importance of the presently "focused" application's execution, the "focused" application is likely to suspend its operations in step 706. During the interrupt handling in step 708, the answering machine program 106 becomes the "focused" application of MASE 102 without having to respond to "switch to" voice commands. In other words, in this scenario, answering program 106 starts executing from step 612 as shown in FIG. 6. Similar to previous discussions on FIG. 6, a user may begin manipulating the answering machine 406 through application specific voice commands. After the user is finished and the interrupt is handled, the user is given the option to "switch to" other available speech applications in step 710. An alternative method would permit the originally "focused" application, or device control program 104, resumes control in step 710 and continues executing from just prior to the occurrence of the interrupt. As has been shown, device control program 104 and answering machine program 106 transition back and forth seamlessly.

It should be apparent to one ordinarily skilled in the art to either implement interrupt manager 204 to monitor interrupts constantly or periodically. It should also be obvious to one with ordinary skill in the art to either construct interrupt manager 204 as an individual entity for all speech applications or as part of each listener 202. It should further be contemplated that interrupt manager 204 may issue commonly known message to speech applications or store such messages in central information object 200. If interrupt messages are stored in central information object 200, speech applications then need to either monitor information central information object 200 constantly or periodically.

When a remote user and a local user are simultaneously using the present invention, some additional user feedback aside from typical display notifications and sound notifications may be necessary. For instance, when device control program 104 is suspended in step 706, issuing a notification of "waiting for processing" may be necessary to the local user. On the other hand, if device control program 104 is executing a critical portion of its routine and the incoming interrupt must wait, a notification of "system busy, please try again" may be necessary to the remote user. In any event, informing users the status of their requests improves the perception of a seamless integration among different speech applications.

Thus, a method and apparatus for managing multiple speech applications has been disclosed. Although the present invention has been described particularly with reference to the figures, it will be apparent to one of the ordinary skill in the art that the present invention may appear in any number of systems which provide management of multiple speech applications. It is further contemplated that many changes and modifications may be made by one of ordinary skill in the art without departing from the spirit and scope of the present invention.

What is claimed is:

1. A method of managing multiple speech applications, the method comprising:
   a. developing said speech applications based on a common development platform; and
   b. providing a common environment to interface with said speech applications, receive information from an application information storage and a plurality of speech input sources, allow said speech applications to execute simultaneously and transition from one said speech application to another seamlessly.

2. The method according to claim 1, said common environment can interact with other environments supporting non-speech recognition applications seamlessly.

3. The method according to claim 1, said application information storage further comprises persistent information of said speech applications.

4. The method according to claim 3, further comprises:
   a. retrieving information from said application information storage and said speech input sources;
   b. allowing a user to select a designated speech application from said speech applications to focus on; and
   c. maintaining said retrieved information and information from said speech applications.

5. The method according to claim 4, said common environment further includes a mutual exclusion policy.

6. The method according to claim 5, said common environment further includes simultaneous support for a plurality of local users and a plurality of remote users.

7. The method according to claim 3, said application information storage is a registry system.

8. An apparatus for managing multiple speech applications, the apparatus comprising:
   a. at least one speech input source;
   b. an application information storage to store persistent information of said speech applications that operate on said speech input source; and
   c. a common environment to interface with said speech applications, receive information from said application information storage and said speech input source, allow said speech applications to execute simultaneously and transition from one said speech application to another seamlessly.

9. The apparatus according to claim 8, said application information storage is a registry system.

10. The apparatus according to claim 8, said speech applications are developed based on a common development platform.

11. The apparatus according to claim 8, said common environment can interact with other environments supporting non-speech recognition applications seamlessly.

12. The apparatus according to claim 8, said common environment further comprises:
   a. at least one listener to retrieve information from said application information storage and said speech input source;
   b. a transition command mapping of said speech applications, coupled to said listener to allow a user to select a designated speech application from said speech applications to focus on; and
   c. a central information object, coupled to said listener, to maintain information from said listener and said speech applications.

13. The apparatus according to claim 12, said common environment further includes a mutual exclusion policy.

14. The apparatus according to claim 13, said common environment further includes simultaneous support for a plurality of local users and a plurality of remote users.

15. A machine readable medium having embodied thereon instructions, which when executed by a machine, causes said machine to manage multiple speech applications, said instruction comprising:
   a. developing said speech applications based on a common development platform; and
   b. providing a common environment to interface with said speech applications, receive information from an application information storage and a plurality of speech input sources, allow said speech applications to execute simultaneously and transition from one said speech application to another seamlessly.

16. The machine readable medium according to claim 15, said common environment can interact with other environments supporting non-speech recognition applications seamlessly.

17. The method according to claim 15, said application information storage further comprises persistent information of said speech applications.

18. The machine readable medium according to claim 17, wherein said common environment further comprises:
   a. retrieving information from said application information storage and said speech input sources;
   b. allowing a user to select a designated speech application from said speech applications to focus on; and
   c. maintaining said retrieved information and information from said speech applications.

19. The machine readable medium according to claim 18, said common environment further includes a mutual exclusion policy.

20. The machine readable medium according to claim 19, said common environment further includes simultaneous support for a plurality of local users sand a plurality of remote users.

21. The machine readable medium according to claim 17, wherein said application information storage is a registry system.

* * * * *